INVENTOR.
WILBUR T. HARRIS
BY James and Franklin
ATTORNEYS

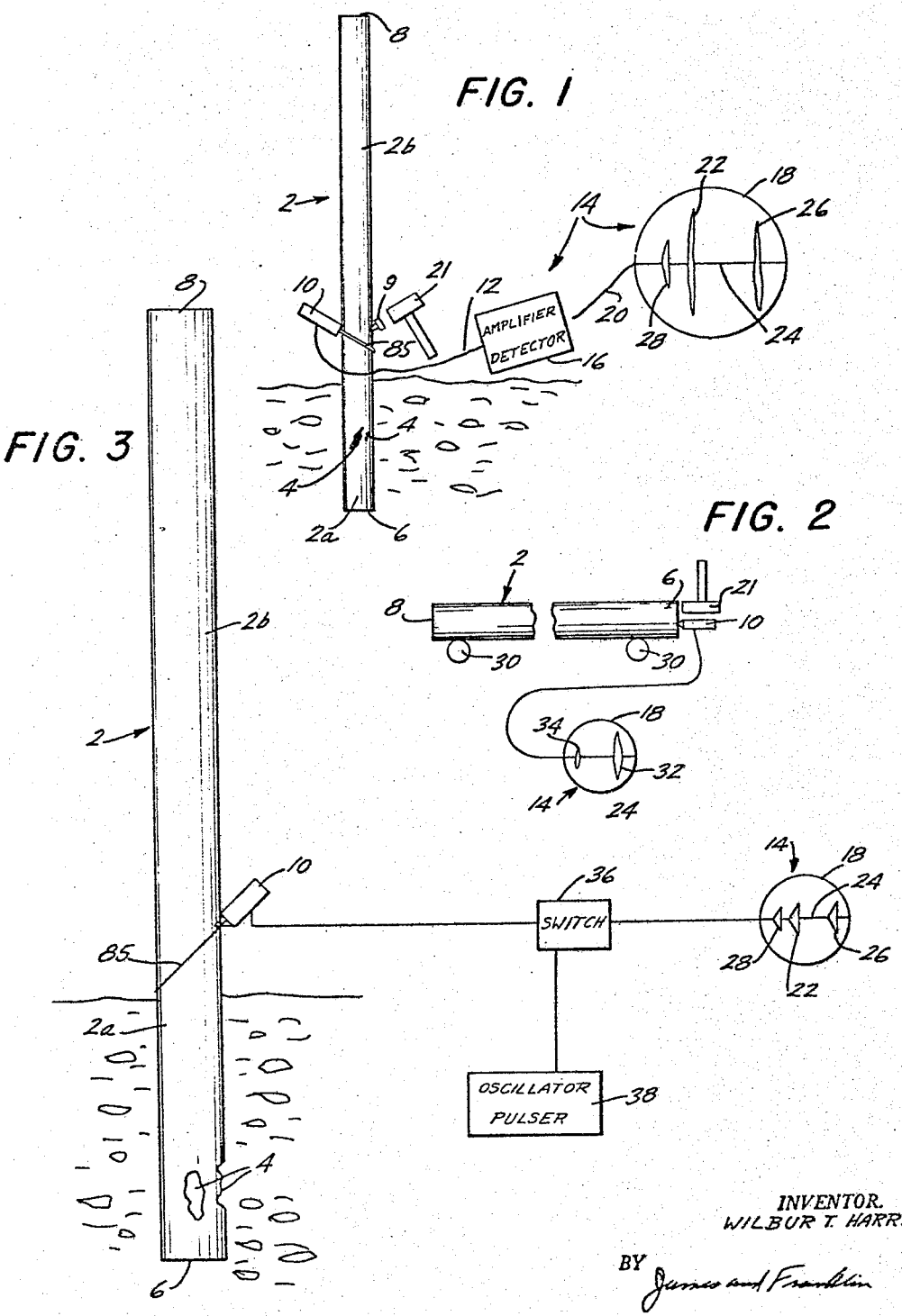
Dec. 4, 1962 — W. T. Harris — 3,066,525
POLE TESTING APPARATUS
Filed Feb. 24, 1960 — 2 Sheets-Sheet 1
INVENTOR.
WILBUR T. HARRIS
BY James and Franklin
ATTORNEYS Dec. 4, 1962 W. T. HARRIS 3,066,525
POLE TESTING APPARATUS
Filed Feb. 24, 1960

3,066,525
Patented Dec. 4, 1962

3,066,525
POLE TESTING APPARATUS
Wilbur T. Harris, Woodbury, Conn., assignor to The Harris Transducer Corporation, Woodbury, Conn., a corporation of Connecticut
Filed Feb. 24, 1960, Ser. No. 10,781
1 Claim. (Cl. 73—67.8)

The present invention relates to a method for testing poles, such as those used to support power and telephone lines, for defects, and to apparatus for use therewith.

Wooden poles are widely used for supporting wires, conduits and the like. Since they must stand for long periods of time and are usually exposed to various deteriorative forces (wind, weather, ground moisture, borers, woodpeckers, automobile accidents, etc.), it is imperative that only poles which are in perfect condition be used, and once they have been erected their condition must be checked periodically.

This poses several very troublesome problems. Before a pole is selected for use it is not too difficult to subject it to visual inspection, but only the external surface of the pole can be inspected with any degree of surety, and defects which lie wholly within the interior of the pole often remain undetected. These defects, of course, constitute a source of weakness which may cause breakage of the pole when subjected to high winds or strong impacts, as when an automobile may strike the pole.

Once the pole has been placed in use, with one end embedded in the ground for an appreciable distance and the main length of the pole extending above the ground for a great distance, inspection for defects becomes very difficult and uncertain even as to those defects which may be exposed on the exterior surface of the pole. In practice that portion of the pole extending above the ground is inspected by a person who climbs the pole. This is time consuming, thus limiting the number of poles which can be inspected by a given individual in a given period of time. Because it requires intense physical exertion and precarious positioning, there is a natural tendency on the part of the person climbing the pole to get the job over with quickly, and this, of course, does not make for reliability. The portion of the pole which is buried in the ground is most susceptible to deterioration, as through the attack of ground moisture. Yet it is this very portion of the pole which it is most difficult and troublesome to inspect. Actual excavation of the ground around the pole is required, and this must be done very carefully and in a piece-meal manner in order that the pole should not fall.

Despite these obviously serious disadvantages, the above described inspection method is, it is believed, almost universally used by power and telephone companies today.

It is the prime object of the present invention to devise a method for the testing of poles and the like which will avoid the above disadvantages. In particular the method of the present invention will provide for the detection of defects whether they are visible on the surface of the pole or completely hidden within the interior of the pole, and no matter where they may be located along the length of the pole, whether beneath the surface of the ground or high above the ground. The method of the present invention is applicable to the testing of poles before they have been put in place and after they have been erected, but its advantages are most outstanding in the latter situation.

In accordance with the present invention a pulse of vibratory energy is caused to pass longitudinally through the pole, and the vibrations thus produced in the pole are detected and compared with the initial pulse, as to type of vibration or as to the length of time which has elapsed between the initiation of the original pulse and the detection of the particular vibrations in question, or both. This comparison will indicate the existence of defects in the pole, can show the general types of defects involved, and can also indicate their location along the length of the pole.

When a pulse of vibrations, preferably in the ultrasonic range, is caused to travel longitudinally of a pole, that pulse will reach the end of the pole and be reflected therefrom, returning longitudinally along the pole in the opposite direction. Discontinuities in the pole structure, such as might be caused by rot, pieces of metal, holes and the like, will also reflect the vibrations. Equipment is readily available which will detect these reflected vibrations and give some indication, preferably visual, of their nature and of the time which has elapsed between the initiated pulse and the detection of the reflected vibrations. Reflections from a given end of the pole can be differentiated from other reflections in various manners, as by observing their size and the length of time between initiation or detection or the nature of the reflection, and the existence of reflected vibrations other than reflections from the pole ends will indicate the existence of irregularities in the pole. The individual carrying on the testing can then give his careful attention to those areas of the pole where such irregularities have been indicated to exist, and need not expend his time, energy or power of concentration on those areas of the pole which are in satisfactory condition.

The pulse of vibratory energy can be provided either by an appropriately actuated transducer which is operatively connected to the pole so as to impart vibrations thereto, or by means of a mechanical blow, such as the impact of a hammer, applied to the pole in such a way as to cause vibrations to travel longitudinally thereof. The reflected vibrations may be detected by a transducer which is operatively connected to the pole so as to detect vibrations moving longitudinally along the pole, that transducer in turn being connected to some suitable indicating device, such as an oscilloscope or an oscillograph of known type. The detection by the transducer of the initiated pulse can trigger the indicating device, so that the indicating device can measure and show the time lapse (usually in the order of a fraction of a second) between the initiated pulse and the various detected reflections thereof. Since the speed of travel of the vibrations within the pole is known, being dependent upon the known material of which the pole is formed, the indicated periods of time lapse can readily be translated into indications of distance from the point on the pole where the initial pulse was initiated.

Obviously the method of the present invention represents a great saving in time. The testing equipment can be set up on a pole in a minute or so, and the actual test takes only a few seconds. If the test is negative nothing more need be done with respect to that particular pole. Pole climbing or ground excavation is rendered entirely unnecessary except in those instances where suspicious conditions have been indicated. If the test is positive the individual carrying out the test knows precisely where to look for the defects in order to explore them and evaluate their significance. His attention is thus concentrated only on those particular locations on the pole where troublesome or suspicious conditions are shown to exist.

To the accomplishment of the above, and to such other objects as may hereinafter appear, the present invention relates to a method for the testing of poles or the like, and to apparatus specially designed for use therein, all within the scope of the instant invention as defined in the appended claim, and as described in this specification, taken together with the accompanying drawing, in which:

FIG. 1 is a schematic view indicating one method of carrying out the instant invention for poles already in place in the ground, the initial vibratory pulse being initiated by a physical blow;

FIG. 2 is a schematic view indicating the general procedure of FIG. 1 applied to a pole before it has been inserted into the ground;

FIG. 3 is a view similar to FIG. 1, but in which a single transducer is employed for initiating the vibratory pulse and for detecting the reflections thereof;

Figure 4:
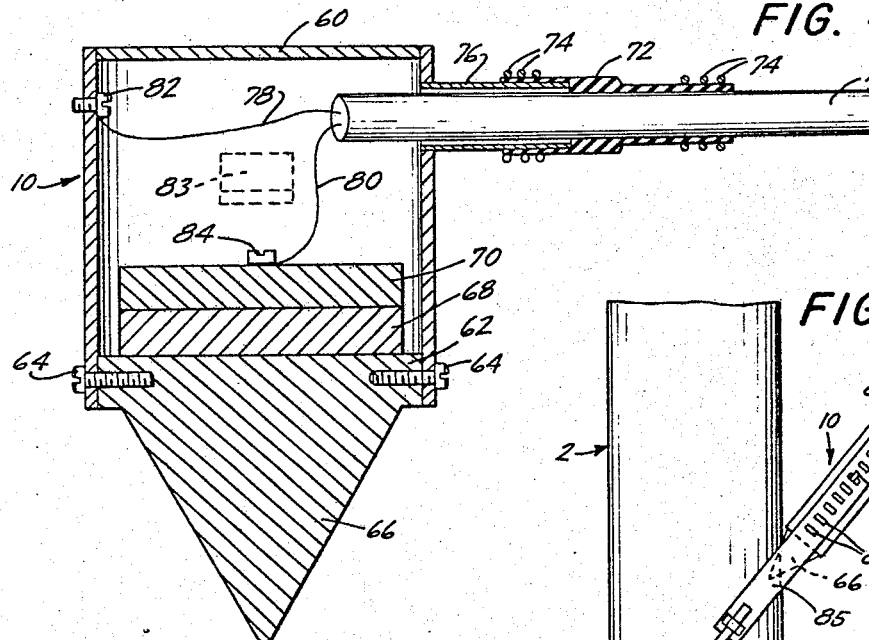
FIG. 4 is a cross sectional view of a typical transducer specially designed for use in connection with the method of the instant invention.

Having reference first to FIG. 1, which discloses one way in which the instant invention can be carried out, a pole generally designated 2 is shown in upright position, a portion 2a thereof being embedded in the ground and a portion 2b thereof extending above the ground. For purposes of exemplification the portion 2a of the pole is provided with rotted areas 4 located approximately midway between the level of the ground and the bottom end 6 of the pole 2. The distance from the ground to the upper end 8 of the pole 2 is much greater than the distance from ground level to the lower pole end 6. Under ordinary circumstances the rotted areas 4 could be discovered only if the ground around the pole 2 were excavated, and then only if the excavation happened to be made along that side of the pole where the rotted areas 4 were exposed. If these defects were completely inside the pole they might never be discovered until the pole broke because of them.

In accordance with the present invention a spike 9 is driven into the pole 2 at some convenient distance above the ground, and a transducer 10 is secured to the pole in any appropriate manner at approximately the same level. The transducer is electrically connected, as schematically indicated by the line 12, to detecting means generally designated 14 such as a conventional oscilloscope or oscillograph, that detecting means 14 being here schematically shown as comprising appropriate circuitry 16 for detection and amplification of the vibrations sensed by the transducer 10, to which circuitry 16 an indicating scope 18 is connected as indicated by line 20.

Since the vibrations which are to be produced within the pole 2 are to travel longitudinally of that pole, both the spike 9 and the transducer 10 are operatively associated with the pole 2 so as to make an effective acute angle (e.g. thirty degrees or so) therewith.

A vibratory pulse is created in the pole 2 by striking the exposed end of the spike 9 sharply with a hammer or mallet 21. This pulse of vibrations will be detected by the transducer 10, but preferably will not be indicated on the scope 18. However, the timing or sweep circuit of the scope 18 may be triggered by the detection of this generated pulse of vibrations, by means which are well known. The vibration pulse will travel longitudinally through the pole 2 simultaneously both up and down from the point where it is initiated. The pulse, when it reaches the lower end 6 of the pole, will be reflected therefrom and move upwardly, and will be detected by the transducer 10, giving rise to the pip or other type of indication 22. The distance from the left hand end of the horizontal line 24 on the scope 18 to the pip 22 will correspond to the distance between the spike 8 and the transducer 10 (both of which are, as shown, located at the same height above the ground) on the one hand and the bottom pole end 6 on the other hand. The pulse of vibrations which moves upwardly along the pole will be reflected from the upper end 8 thereof and then reflected down, to be detected by the transducer 10 so as to form the pip or indication 26. The distance between the left hand end of the horizontal line 24 and the pip 26 will correspond to the distance between the spike 9 and transducer 10 (located at the same level) on the one hand and the pole end 8 on the other hand. Strictly speaking, of course, the spacing between the pips 22 and 26 and the left hand end of the horizontal line 24 represent twice the distances mentioned, since the pulse must travel to the pole end and back before it is detected. This is readily taken into account in translating the pip spacing into corresponding lengths along the pole, based upon the known speed of travel of vibrations through the particular material of which the pole is formed.

In a perfect pole only the pips 22 and 26 will appear. However, where discontinuities such as the rotted areas 4 are present and the pulse reaches those areas 4, a portion of that pulse will be reflected therefrom, and when those reflected vibrations are detected by the transducer 10 another pip, indicated at 28, will be caused to appear on the screen 18. The existence of the pip 28 will indicate the presence of a possible defect.

The particular location of the pip 28 shown in FIG. 1, occurring as it does in advance of the pip 22 corresponding to reflection of the pulse from the pole bottom end 6, makes the precise location of the detected discontinuity somewhat ambiguous. The distance between the pip 28 and the left hand end of the line 24 indicates how far along the pole 2 from the location of the spike 8 and transducer 10 the discontinuity is, but it does not indicate whether the discontinuity is above or below the transducer spike 10 (and it will be remembered that the initiated pulse moves simultaneously up and down from its point of initiation). This is not a particularly serious drawback, since most defects occur in the buried ends 2a of the poles, and in addition visual inspection of the exposed upper portion 2b of the pole 2 at the heights involved is not too difficult. If the pip 28 occurs between the pips 22 and 26 then it is clear that the discontinuity which the pip represents is on the exposed portion 2b of the pole 2, and at a distance above the location of the spike 8 and transducer 10 greater than the distance from those elements to the pole bottom end 6.

FIG. 2 illustrates a modification of the method disclosed in FIG. 1 for use in testing poles before they have been placed in the ground. The pole 2 is supported in any appropriate manner on a plurality of rests 30, the transducer 10 is attached to the pole end 6, and the pulse of longitudinal vibrations is initiated by striking the pole end 6 directly with a hammer or mallet 21. As before, the detection of the initiation of this pulse by the transducer 10 can trigger the oscilloscope or other indicating means 14. When the method is carried out in this way there will be only a single reflection of the initiated pulse under normal circumstances, from the pole end 8, and this is indicated by the pip 32. If a defect is present some of the pulse will be reflected therefrom and will be indicated by the pip 34. With this system the distance between the pip 34 and the left hand end of the horizontal line 24 will accurately represent the distance of the detected discontinuity from the pole end 6 and thus will locate the defect without ambiguity.

FIG. 3 schematically indicates an arrangement by means of which the method can be carried out entirely electronically, and without having to rely upon any manual impact. The transducer 10 is connected to the pole 2 as before, and is electrically connected, by means of electronic switch 36, not only to the screen 18 of an indicating device 14 such as an oscilloscope but also to an oscillator-pulser unit 38. The unit 38 and the switch 36 will so coact as, when energized, to periodically produce pulses of vibratory electrical energy of appropriate frequency, preferably in the ultrasonic range, which are transmitted to the transducer 10, thus causing that transducer 10 to impart a corresponding pulse of mechanical vibration to the pole 2. The switch 36 then functions to disconnect the oscillator-pulser unit 38 from the circuit, to trigger the detecting and indicating device 14, and to connect that device to the transducer 10 so as to indicate the reception by the transducer 10 of reflected pulses, just as in FIG. 1. Accordingly, the indicated pips in FIG. 3 have the same reference numerals as the corresponding pips in FIG. 1.

The size of the defect-indicating pips 28 or 34 will be some measure of the size of the discontinuity represented thereby. The sharpness or fuzziness of these pips may be some indication of the nature of the discontinuity, a hard foreign body producing a sharply defined reflection and a soft and irregularly contoured area producing a fuzzy or ill-defined pip.

Figure 6:
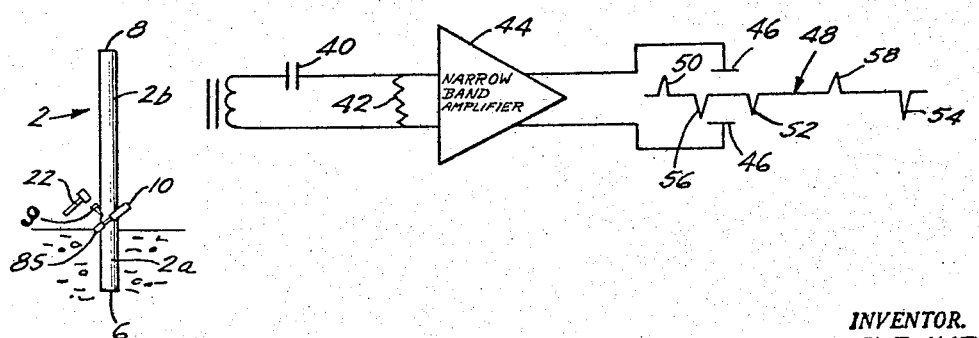
FIG. 6 is a schematic view of circuitry which might be employed in connection with the carrying out of the method of the instant invention.

FIG. 6 discloses schematically a somewhat sophisticated type of circuitry by means of which information concerning the nature of the discontinuity may be obtained. If the duration of the initiated pulse is rather short, corresponding to one-half a sine wave for moderately high frequencies of vibrations, as will be the case with a hammer blow, the band width of the vibrations will be fairly broad. If the receiving transducer and detector circuits are, for practical purposes, non-resonant at these frequencies ("dead beat") and are filtered to accept a frequency band of the desired band width, the phase of the detected reflected vibrations may be indicated, and certain inferences can be drawn therefrom. Thus, in FIG. 6, the transducer 10 is electrically connected by a series capacitor 40 and parallel resistor 42 to a narrow band amplifier 44 which is in turn connected to the deflecting plates of an oscilloscope 46. The oscilloscope trace, in idealized form, is generally designated 48. The pip 50 represents the initial generated pulse, whose phase is indicated as positive. The reflections from the bottom pole end 6 and top pole end 8, represented by the pips 52 and 54 respectively, will be reversed in phase relative to the initiated pulse 50. The pip 56 representing a detected discontinuity is also reversed in phase relative to the initial pulse, thus indicating that the discontinuity is in the nature of an acoustically soft area (e.g. rot or decay). The pip 58 has the same phase as the initiated pulse 50, thus indicating that the discontinuity which it represents is an acoustically hard spot (e.g. a piece of metal or a hard knot). Thus the individual carrying on the testing will not only know where to look for a possible defect but will also have some idea of the particular type of defect for which he is looking.

Figure 5:
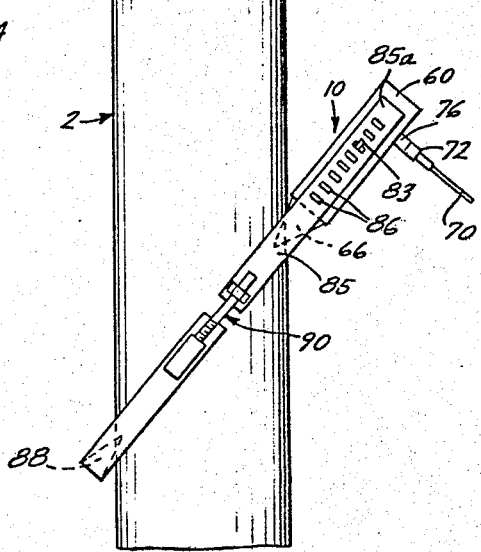
FIG. 5 is a side elevational view showing the transducer of FIG. 4 in position on a pole.

FIGS. 4 and 5 illustrate one type of transducer 10 which is particularly well adapted to be employed in the method of the present invention. It comprises a housing generally designated 60 and formed of conductive material to which a hardened steel base 62 is secured, as by the screws 64, that base having extending therefrom and from the housing 10 a conical or otherwise pointed tip 66. Operatively connected to the base 62, as by being directly bonded thereto, is a piezoelectric transducing plate 68 of appropriate composition, such as barium titanate. An aluminum or other conductive plate 70 is bonded to the upper surface of the piezoelectric plate 68. A cable 71 extends into the housing 60, with its entry thereto preferably being sealed by means of nipple 72 firmly pressed, by means of binding 74, against the cable 71 and the tube 76 extending from the housing 60. Two leads 78 and 80 extend from the cable 70. The lead 78 is connected by means of screw 82 to the conductive housing 60 and therefore, via base 62, to the lower surface of the piezoelectric plate 68. The lead 80 is connected by means of screw 84 to the upper surface of the aluminum plate 70 and, via the plate 70, to the upper surface of the piezoelectric plate 68. The hardened steel tip 66 is adapted to make efficient acoustic interconnection with the pole 2, as by penetrating that pole, so that vibrations set up in the pole will be transmitted to the tip 66 and base 62, thereby to affect the piezoelectric plate 68 and produce in the leads 78 and 80 electrical signals corresponding to the detected vibrations. By the same token the application of appropriate electrical signals to the leads 78 and 80 will be transduced into corresponding physical vibrations of the tip 66, to be communicated thereby to the pole 2.

In order to facilitate the operative connection of the transducer 10 to the pole 2, the housing 60 is provided, on each of its sides, with hooks 83. The transducer is adapted to be used in conjunction with a strap 85 of any appropriate flexible material, such as sheet metal, the ends 85a of those straps being provided with a series of apertures 86 spaced therealong into which the hooks 83 are selectively receivable, thereby to adjust the effective length of the strap 85 so as to encompass poles 2 of different girths. The strap 85 is preferably provided, at a point therealong preferably diametrically opposite the transducer 10, with a spike or tooth 88 adapted to dig into the pole 2. It may also be provided with a turnbuckle or a toggle tightener generally designated 90 (one of which may be provided on each side of the strap 85) in order to tighten the strap 85 after it has been applied around the pole 2, thereby to cause the tooth 88 and the transducer tip 66 to bite into the pole 2, thus retaining the transducer 10 in position on the pole and in proper angular relation thereto so as to maintain an efficient vibration-communicating relationship with the pole 2 in connection with vibrations traveling longitudinally thereof.

From the above description it will be apparent that with the method of the present invention poles and the like may be tested for defects with a considerably greater degree of reliability than has heretofore been possible, particularly with regard to defects not visible on the surface of the pole, and that the testing may be accomplished much more rapidly, conveniently and inexpensively, than has heretofore been possible. With the use of a standardized kit comprising a transducer 10, an attaching strap 85, and appropriate electrical equipment such as an oscilloscope, the entire time involved in testing a pole already standing in the ground may be reduced to a matter of a minute or two, at the most. The attention of the individual carrying out the testing will be immediately drawn to those locations on a given pole where defects might exist, and he will not have to devote any time or energy to those poles which are in good condition. It is possible, by using an oscillograph, to make a permanent record of the condition of the pole when tested at a particular time, and this record may advantageously be employed both for comparison with tests made at other times or for checking the efficiency and capability of the individual carrying out the tests.

The transducer 10 as specifically disclosed in FIGS. 4 and 5 is of the piezoelectric type. It will be apparent, of course, that transducers of other specific types, such as those utilizing magnetostrictive elements, could be employed with equal value. While but a limited number of embodiments have been here disclosed, it will be apparent that many variations may be made therein, all within the spirit of the invention, as defined in the following claim.

I claim:

A transducer assembly adapted to be used for the testing of wooden poles or the like and comprising a housing, a part protruding from said housing and having a substantially pointed end, said part being adapted to penetrate said pole, a transducer unit in said housing and operatively vibrationally connected to said part, a strap secured to said housing and adapted to encircle said pole, and means for adjusting the length of said strap, thereby to secure said assembly to poles of different transverse dimensions, said strap carrying a pole-penetrating member located substantially diametrically opposite said housing.

References Cited in the file of this patent

UNITED STATES PATENTS

| | | |
|---|---|---|
| 2,280,226 | Firestone | Apr. 21, 1942 |
| 2,448,399 | Shaw | Aug. 31, 1948 |
| 2,461,543 | Gunn | Feb. 15, 1949 |
| 2,601,779 | Firestone | July 1, 1952 |
| 2,699,061 | Drake | Jan. 11, 1955 |
| 2,908,161 | Bincer | Oct. 13, 1959 |

FOREIGN PATENTS

| | | |
|---|---|---|
| 704,952 | France | Mar. 2, 1931 |
| 766,981 | Great Britain | Jan. 30, 1957 |

OTHER REFERENCES

Nondestructive Testing Handbook, McMaster, vol. II, section 48, page 1. Ronald Press 1959. (Copy in Div. 36.)

(Same Handbook mentioned above), pages 28–30.